Patented Aug. 5, 1941

2,251,778

UNITED STATES PATENT OFFICE 2,251,778

MONO-(ORGANO MERCURY) ACETYLIDES

Wilhelm Bonrath, Leverkusen I. G. Werk, and Heinrich Klös, Wuppertal-Elberfeld, Germany, assignors to Winthrop Chemical Company, Inc., New York, N. Y., a corporation of New York No Drawing. Application July 20, 1938, Serial No. 220,400. In Germany July 20, 1937

3 Claims. (Cl. 260—431)

The object of this invention is certain mono-(organo mercury) acetylides which are suitable for use as seed grain disinfectants.

It is known that organo mercury compounds of the formula

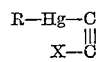

in which R stands for an organic residue, X for the group R—Hg— or any organic radical may be used as seed grain disinfectants.

In accordance with this invention it has been established that the hitherto unknown mono-(organo mercury)-acetylides of the formula R—Hg—C≡CH in which R stands for any organic radical, one carbon atom of which is directly linked to the mercury atom, are much more efficacious as disinfectants especially for seed grain than organo mercury compounds of the type described above in which both hydrogen atoms of the acetylide residue have been substituted.

In our new compounds R may designate for instance an alkyl-, cycloalkyl-, aryl- or aralkyl residue. Such residues may be further substituted for instance by hydrocarbon, nitro, amino or alkoxy radicals or by halogen atoms. Suitable compounds are by way of example Mono-(butyl mercury)-acetylide
Mono-(isopropyl mercury)-acetylide
Mono-(methoxyethyl mercury)-acetylide
Mono-ethoxyethyl mercury)-acetylide
Mono-(cyclohexyl-methylether mercury)-acetylide The best results have been obtained with mono-(aryl-mercury)-acetylides and particularly with mono-(phenyl mercury)-acetylide. As further representatives of this series there may be cited for example Mono-(naphthyl mercury)-acetylide
Mono-(phenol mercury)-acetylide
Mono-(cresol mercury)-acetylide
Mono-(toluyl mercury)-acetylide
Mono-(dimethylaniline mercury)-acetylide
Mono-(methoxy-phenyl mercury)-acetylide
Mono-(chloro-phenyl mercury)-acetylide
Mono-(nitro-phenol mercury)-acetylide
Mono-(naphthol mercury)-acetylide The mono-(organo mercury)-acetylides may be prepared by reacting organo mercury hydroxides, organo mercury oxides or organo mercury salts with acetylene respectively with carbides which when decomposed with water yield acetylene, in the presence of a solvent. It is advisable to work with high dilutions. The concentration of the organo mercury compound is suitably kept in the reaction mixture below 1/50 gram per mol per liter. For carrying out this process acetylene may either be reacted upon the organo mercury hydroxide finally formed or with any organo mercury salt in the presence of an alkaline reacting agent. Furthermore, it is possible to react an organo mercury salt with a carbide yielding acetylene on decomposition with water such for instance as calcium carbide or magnesium carbide. As starting organo mercury compounds are suited compounds in which the organic residue is either cyclically bound or has an open chain such as alkyl-, cycloalkyl-, aralkyl- or aryl mercury compounds which, if desired, may be substituted in the hydrocarbon chain. As substituents there may be cited hydroxy- or amino groups which may be protected by substitution such as ether- or ester groups or acylamino-, alkylamino radicals as well as nitro- or alkyl groups and halogen atoms.

Suitable starting materials are for instance alkyl mercury halogenides such as butyl mercury bromide, alkoxy-alkyl mercury nitrates such for instance as methoxyethyl mercury nitrate, cycloaliphatic or aromatic mercurised compounds such as cyclohexyl-methylether mercury chloride, phenyl mercury acetate, phenyl mercury hydroxide, chlorophenyl mercury chloride and the dimethylaniline mercury acetate.

As solvent water has proved to be particularly advantageous. However, also other solvents usually employed for preparing solutions of organo mercury compounds such as methyl alcohol, ethyl alcohol or acetone may be employed.

For technical reasons we prefer reacting calcium carbide with organo mercury salts in aqueous solution.

In general the mono-(organo mercury)-acetylides are colorless compounds which are waterinsoluble provided that no solubilizing substituents capable of forming salts such as carboxylic-, amino-, sulfonic acid or hydroxyl-radicals are present. To the contrary they are better soluble in certain organic solvents such as methyl- and ethyl alcohol. They display a characteristic odor resembling that of garlic. They are decomposed by acids such as sulfuric or hydrochloric acid with the evolution of acetylene. In general the mono-(organo mercury)-acetylides have a rather high melting point. The mono-(phenyl mercury)-acetylide is a snowish white powder practically insoluble in water, only difficultly soluble in alcohol and ether, which remains unchanged when heated to 270° C.; the mon-(methoxy-ethyl mercury)-acetylide with the same characteristics as to solubility remains unchanged on heating up to 175°, then begins to darken, but even at 250° it is not yet melted.

The mono-(organo mercury)-acetylides are efficacious disinfectants and may particularly be used for the dry disinfection of seed grain. For the latter purpose they are employed in admixture with suitable inert diluents such as chalk, talc, wood flour, brown coal, gypsum, plaster of Paris or naphthol pitch sulfonate. For improving the chemo-therapeutical index adsorbing agents, such for instance as diatomaceous earth, silica gel or active carbon may be added. The mono-(organo mercury)-acetylides may further be used in conjunction with other seed dressings such as phenyl mercury acetate, methoxy ethyl mercury silicate, ethyl mercury nitrate or mercury-free compounds such as hydroxy phenyl hydrazines. Further growth promoting substances such as vitamin $B_1$ or $\beta$-indolyl acetic acid may be present.

By means of seed dressings containing as active constituent a mono-(organo mercury)-acetylide all plant diseases which are conveyable by the seed grain such as fusarium, stone blight of wheat, blight of barley and winged blight of oats may be combatted. Since phenyl mercury acetate is not sufficiently efficacious against winged blight of oats it is surprising that this plant disease may be effectively combatted by mono-(phenyl mercury)-acetylide.

For the dry disinfection of seed grain the said mono organo mercury acetylides are applied in a concentration of about 0.5-2% of mercury.

In general it is sufficient to use seed dressings on the basis of mono organo mercury acetylides of a concentration of 0.75-1% mercury and applying these seed dressings to the seeds in a dosage of 1-3:1000. For instance the germination of spores of barley blight is prevented by treating the seed grain attacked with a composition containing 0.75% of mercury in the form of mono-(phenyl mercury)-acetylide in a dosage of 1:1000; the germination of spores of stone blight of wheat is prevented by means of the same composition in a dosage of 2:1000. To the contrary the known seed dressing agents containing as active constituent bis-(organo mercury)-acetylides have to contain 1.5-2% of mercury in order to be effective against fusarium which is rather easy to be combatted in a dosage of 1.5:1000. Reference is made in this connection to British patent specification No. 456,782.

The following examples illustrate the invention without, however, restricting it thereto, the parts being by weight:

Example 1

On combatting the winged blight of oats with seed grain disinfectants containing 1% of mercury as mono-(phenyl mercury)-acetylide in admixture with talc the following result has been obtained:

| Dosage | Attack in percent |
|---|---|
| 3:1000 | 0 |
| Untreated | 49.2 |

The mono-(phenyl mercury)-acetylide can be prepared in the following way:

65 parts of phenyl mercury acetate are treated with a solution of 12,000 parts of water and 16 parts of sodium hydroxide until the material has nearly completely dissolved.

Into the filtered, weakly alkaline solution as long as the caused precipitate no longer increases acetylene gas is introduced. Then it is sucked off and dried on the water bath; a practically snowish-white product is thus obtained. The analysis yields a proportion of Hg:HC≡about 207:26. The mercury content amounts to 66%.

Example 2

A solution of 56 parts of methoxyethyl mercury acetate in 11,000 parts of water is made alkaline with diluted soda lye and filtered. Into this solution acetylene gas is passed in as long as the precipitate no longer increases. It is sucked off, washed in some alcohol, sucked off again and then dried on the water bath. The new compound is snowish-white, practically insoluble in water, difficultly soluble in alcohol and ether in the cold, and displays a strong odor. On heating the compound remains unchanged up to 175°, slowly darkens, but it is not yet melted at 250°. According to the analysis the mono-(methoxy mercury)-acetylide was obtained. When treating it with acid a violent evolution of gas (probably acetylene) is to be observed; mercury ions are to be detected in the solution.

On standing di-(methoxyethyl mercury)-carbide is precipitated from the filtrate of the mono-(methoxy mercury)-acetylide.

Example 3

By treating 50 parts of butyl mercury bromide with 10,000 parts of water and 12 parts of sodium hydroxide it is almost completely dissolved. Into the filtered solution acetylene is introduced until the precipitate no longer increases. It is then sucked off, washed with some absolute alcohol, sucked off once more and dried on the water bath. The reaction product obtained in a nearly quantitative yield is practically insoluble in water, difficultly soluble in cold alcohol, more easily soluble in hot alcohol. It shows a snowish-white color and possesses a strong odor. This reaction product consists of a mixture of the mono-(butyl mercury)-acetylide with di-(butyl mercury)-carbide.

We claim:

1. Mono-(organic mercury)-acetylides of the formula R—Hg—C≡CH, in which R stands for a radical selected from the group consisting of hydrocarbon and hydrocarbon substituted by a member of the group consisting of nitro, amino, alkoxy and hydroxyl groups and halogen, 1 carbon atom of R being directly linked to the mercury atom.

2. Mono-(organo mercury)-acetylides of the formula R—Hg—C≡CH, in which R stands for an aryl radical, 1 carbon atom of which is directly linked to the mercury atom.

3. Mono-(phenyl mercury)-acetylide of the formula $C_6H_5Hg$—C≡CH.

WILHELM BONRATH.
HEINRICH KLÖS.